(12) United States Patent
Lanter

(10) Patent No.: US 10,557,765 B2
(45) Date of Patent: Feb. 11, 2020

(54) SENSOR DEVICE, DRIVING SYSTEM, METHOD FOR MEASURING A TORQUE AND METHOD FOR CONTROLLING A DRIVING SYSTEM

(71) Applicant: ABAS, Incorporated, Chicago, IL (US)

(72) Inventor: Josua Lanter, Chur (CH)

(73) Assignee: POLYRESEARCH AG, Chur (CH)

( * ) Notice: Subject to any disclaimer, the term of this patent is extended or adjusted under 35 U.S.C. 154(b) by 0 days.

(21) Appl. No.: 16/103,481

(22) Filed: Aug. 14, 2018

(65) Prior Publication Data

US 2019/0003908 A1  Jan. 3, 2019

Related U.S. Application Data

(62) Division of application No. 14/945,712, filed on Nov. 19, 2015, now Pat. No. 10,072,994.

(51) Int. Cl.
| | |
|---|---|
| *B62M 6/40* | (2010.01) |
| *B62M 6/50* | (2010.01) |
| *G01L 3/10* | (2006.01) |
| *G01L 5/22* | (2006.01) |

(52) U.S. Cl.
CPC .............. *G01L 3/101* (2013.01); *B62M 6/40* (2013.01); *B62M 6/50* (2013.01); *G01L 5/225* (2013.01)

(58) Field of Classification Search
CPC ........... B62M 6/50; B62M 6/65; G01D 5/145; G01P 3/487
See application file for complete search history.

(56) References Cited

U.S. PATENT DOCUMENTS

| | | | | |
|---|---|---|---|---|
| 6,467,360 B1* | 10/2002 | Bogdanov | ................ | B62D 6/10 73/862.333 |
| 6,826,969 B1* | 12/2004 | May | ........................ | G01L 3/105 73/862.331 |
| 2004/0035221 A1* | 2/2004 | May | ........................ | G01D 5/14 73/862.331 |
| 2004/0035222 A1* | 2/2004 | May | ........................ | G01L 3/101 73/862.335 |
| 2013/0312539 A1* | 11/2013 | Shimomura | ............ | G01L 3/101 73/862.325 |
| 2015/0211893 A1* | 7/2015 | Huang | ................ | G01D 5/2451 324/207.2 |
| 2015/0217833 A1* | 8/2015 | Silva | ........................ | B62M 6/55 180/206.4 |
| 2017/0001687 A1* | 1/2017 | Usui | ........................ | B62M 6/55 |

* cited by examiner

*Primary Examiner* — Bickey Dhakal
*Assistant Examiner* — Zoheb S Imtiaz
(74) *Attorney, Agent, or Firm* — Blank Rome LLP

(57) ABSTRACT

A sensor device includes a base element extending in an axial direction and a first magneto elastic active region representing a first longitudinal section of a surface of the base element. The first longitudinal section extends in the axial direction and is magnetized in a first circumferential direction. The sensor device further comprises a first magnetic field sensor overlapping with the first longitudinal section, and a second magnetic field sensor disposed at a distance with respect to the first magnetic field sensor along the axial direction and overlapping with the first longitudinal section.

11 Claims, 8 Drawing Sheets

SENSOR DEVICE, DRIVING SYSTEM, METHOD FOR MEASURING A TORQUE AND METHOD FOR CONTROLLING A DRIVING SYSTEM

CROSS-REFERENCE TO RELATED APPLICATIONS

This application is a divisional of and claims the benefit of U.S. application Ser. No. 14/945,712, filed Nov. 19, 2015, entitled "Sensor Device, Driving System, Method For Measuring a Torque And Method For Controlling a Driving System," which application is based on and claims the benefit of priority, under 35 U.S.C. § 119, of German patent application DE 10 2015 113 735.6, filed Aug. 19, 2015; the prior applications are herewith incorporated by reference in their entirety.

BACKGROUND OF THE INVENTION

Field of the Invention

An e-bike or a pedelec ("pedal electric cycle") is an electric bicycle, where the rider's pedaling is assisted by an electric motor. Typically, a torque exerted on the pedal or the bottom bracket is measured and the electric motor supports the mechanic driving power in accordance with the exerted torque. For example, the support may be the larger, the larger the force exerted by the rider is. For measuring the exerted torque magneto elastic torque sensors are used, which are built in the bottom bracket and which measure a change of the magnetic field due to the magneto elastic effect. In addition to the change of the magnetic field caused by the torque, the magnetic field sensor measures external noise fields. These external noise fields may be caused by magnetic or magnetized items in the vicinity of the bottom bracket and further by the Earth's magnetic field.

External magnetic fields may lead to a torque that is greater than the real torque being measured so that a false target value is determined for the support or the power to be delivered by the electric motor. For example, in particular during a slow ride or when braking, external magnetic fields may result in an unwanted and surprising strong acceleration which may be dangerous in certain situations such as turning into a main road or at downward slopes on hills and others.

SUMMARY OF THE INVENTION

It is accordingly an object of the invention to provide a sensor device which overcomes the above-mentioned and other disadvantages of the heretofore-known devices and methods of this general type and to provide a sensor device that is independent from external noise fields. Moreover, it is an object of the present invention to provide a driving system comprising such a sensor device, a method for measuring a torque using the sensor device as well as a method for controlling a driving system.

With the foregoing and other objects in view there is provided, in accordance with the invention, a sensor device, comprising;

a base element extending in an axial direction;

a magneto elastic active region representing a first longitudinal section of a surface of said base element, said first longitudinal section extending in the axial direction and being magnetized in a first circumferential direction;

a first magnetic field sensor overlapping with said first longitudinal section, and a second magnetic field sensor disposed at a distance with respect to said first magnetic field sensor along the axial direction and overlapping with said first longitudinal section.

In other words, according to an embodiment of the invention, a sensor device comprises a base element defining an axial direction and a first magneto elastic active region representing a first longitudinal section of a surface of the base element. The first longitudinal section extends in the axial direction and is magnetized in a first circumferential direction. The sensor device further comprises a first magnetic field sensor overlapping with the first longitudinal section, and a second magnetic field sensor disposed at a distance with respect to the first magnetic field sensor along the axial direction and overlapping with the first longitudinal section.

According to an embodiment, a driving system comprises a driving device for driving a driving element, a sensor element as described above for determining an externally acting force or torque, and a control device for receiving a signal from the sensor element and for controlling a torque or a force acting on the driving element generated by the driving device.

With the above and other objects in view there is also provided, in accordance with the invention, a method for measuring a torque using the sensor device as described above. The method comprises receiving a first signal from the first magnetic field sensor and receiving a second signal from the second magnetic field sensor. The method further comprises determining a difference signal of the first and second signal to determine a noise signal, determining a sum signal of the first and second signals to determine a magnetic field caused by the torque, and determining the torque using the difference signal and the sum signal.

Other features which are considered as characteristic for the invention are set forth in the appended claims.

Although the invention is illustrated and described herein as embodied in a sensor device, a driving system, a method for measuring a torque and a method for controlling a driving system, it is nevertheless not untended to be limited to the details shown, since various modifications and structural changes may be made therein without departing from the spirit of the invention end within the scope and range of equivalents of the claims, The construction and method of operation of the invention, however, together with additional objects and advantages thereof will be best understood from the following description of specific embodiments when read in connection with the accompanying drawings.

The accompanying drawings are included to provide a further understanding of embodiments of the invention and are incorporated in and constitute a part of this specification. The drawings illustrate the embodiments of the present invention and together with the description serve to explain the principles. Other embodiments of the invention and many of the intended advantages will be readily appreciated, as they become better understood by reference to the following detailed description. The elements of the drawings are not necessarily to scale relative to each other. Like reference numbers designate corresponding similar parts.

DETAILED DESCRIPTION OF THE INVENTION

In the following detailed description reference is made to the accompanying drawings, which form a part hereof and in which are illustrated by way or illustration specific embodiments in which the invention may be practiced. In this regard, directional terminology such as "top", "bottom", "front", "back", "leading", "trailing" etc. is used with reference to the orientation of the figures being described. Since components of embodiments of the invention can be positioned in a number of different orientations, the directional terminology is used for purposes of illustration and is in no way limiting. It is to be understood that other embodiments may be utilized and structural or logical changes may be made without departing from the scope defined by the claims.

The description of the embodiments is not limiting. In particular, elements of the embodiments described hereinafter may be combined with elements of different embodiments.

In cylindrically symmetric systems the term "axial" denotes a direction in the longitudinal axis of the cylinder. The term "radial" denotes a direction parallel to the direction of the radius of the cylindrical body. Different points along the circumference of the cylinder may be characterized by defining an angle γ. For example, in FIG. 1 the axial direction corresponds to a direction along the X axis, the radial direction refers to an arbitrary direction from the center of the bottom face of the base element 110 to the surface 190 of the base element. If the system is not cylindrically symmetric, the term "axial" may denote a direction along the longest extension direction or along a longitudinal axis of the system.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

As employed in this specification, the terms "coupled" and/or "electrically coupled" are not meant to mean that the elements must be directly coupled together—intervening elements may be provided between the "coupled" or "electrically coupled" elements. The term "electrically connected" intends to describe a low-ohmic electric connection between the elements electrically connected together.

Figure 1:
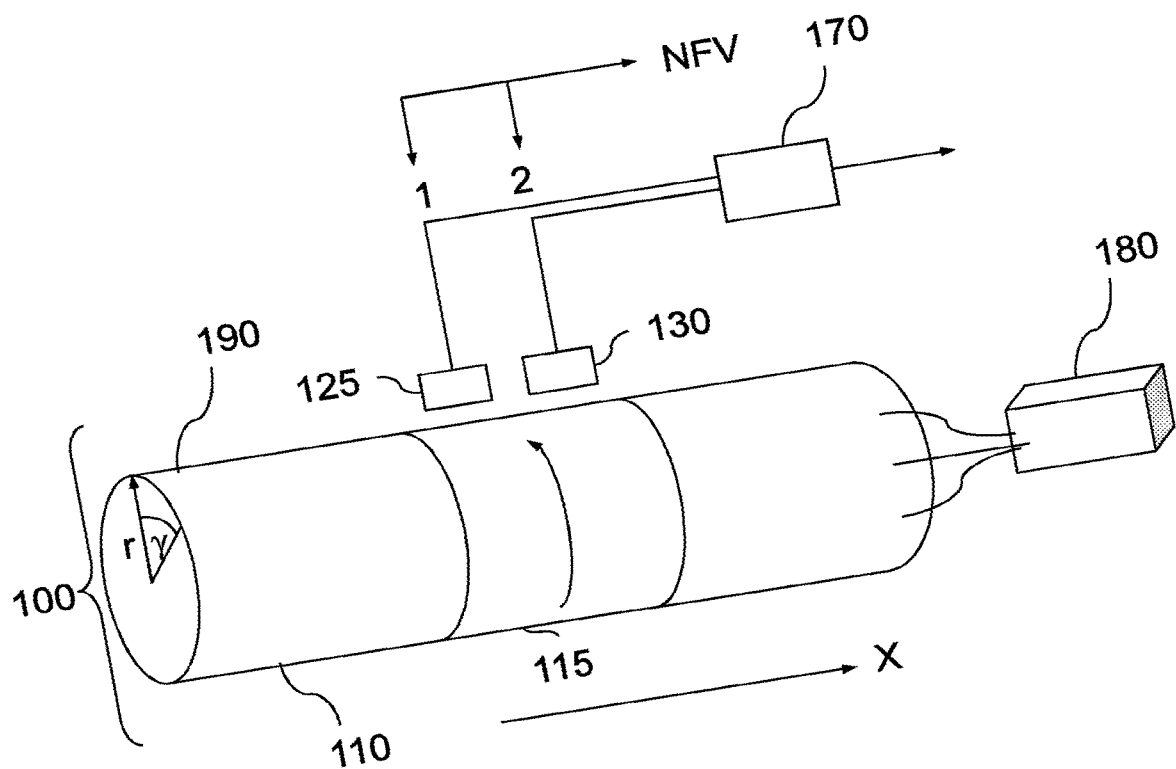
FIG. 1 is a diagrammatic view of an exemplary embodiment of a sensor device according to the invention.
Figure 1:
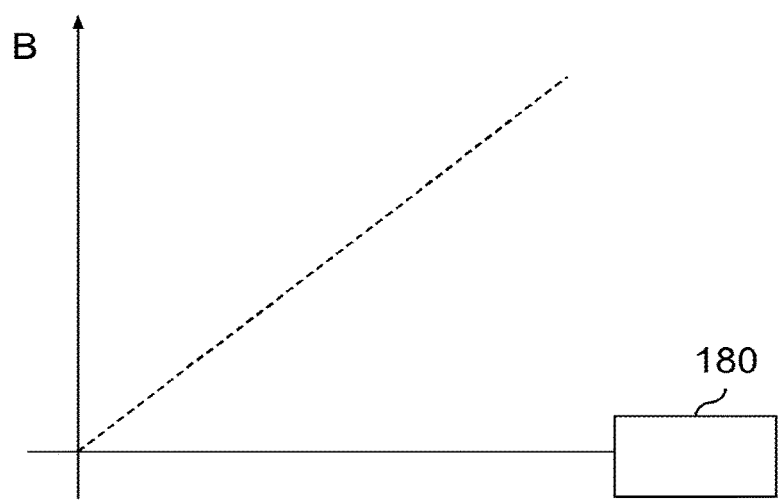

Referring now to the figures of the drawing in detail and first, particularly, to FIG. 1 thereof, there is shown an example of a sensor device according to an embodiment of the invention. The sensor device 100 comprises a base element 110 extending in an axial direction and a first magneto elastic active region 115 representing a first longitudinal section of the surface 190 of the base element 110. The first longitudinal section extends in the axial direction, e.g. the X direction, and is magnetized in a first circumferential direction. The sensor device 100 further comprises a first magnetic field sensor 125 overlapping with the first longitudinal section, and a second magnetic field sensor 130 disposed at a distance from the first magnetic field sensor 125 along the axial direction and overlapping with the first longitudinal section.

The base element 110 may, for example, be a shaft made of a suitable material. For example, the base element may be made from a ferromagnetic material without a permanent magnetization. Examples of the material of the base element comprise iron, steel comprising optional additives such as molybdenum, vanadium, tin, chromium, nickel, cobalt, silicon or aluminum and further arbitrary ferromagnetic alloys. A part of the shaft may form the first magneto elastic active region 115, for example, after this part has been magnetized. For example, this may be accomplished by impressing or applying a permanent magnetization. According to an alternative embodiment, the first magneto elastic active region 115 may be disposed as a separate layer having magneto elastic properties over the base element 110 and may be attached to the base member. In other words, the base element 110 may be integrally formed with the first magneto elastic active region Alternatively, the base element 110 may be formed separately from the first magneto elastic active region. In this case, the first magneto elastic active region 115 and the base element 110 are connected with each other so that a force or a torque acting on the base element will be transferred to the magneto elastic active region 115. The sensor device is based on the effect of magnetostriction, i.e. the change of the magnetization due to mechanical stress that may be caused by a torque or a force acting on the sensor device. A change of the magnetization of the first magneto elastic active region 115 is measured by the first and the second magnetic field sensors 125, 130. By measuring the change of the magnetization, the acting torque or the acting force may be determined.

The base element 110 may be solid. According to a further embodiment, the base element 110 may be a hollow element. When the base element is implemented as a hollow element, the magneto elastic active region 115 and the first and the second magnetic field sensors 125, 130 may be disposed at an inner side of the hollow base element.

The base element 110 may have an arbitrary shape, for instance a cylindrical shape. The radius of the cylindrical element may vary along the axial direction, e.g. the X direction. The base element 110 need not necessarily be implemented as a cylinder but may have an arbitrary shape, as long as the working mechanism of the described embodiment is not impaired. The first magneto elastic active region has a certain extension along the X direction (axial direction) and, thus, constitutes a first longitudinal section of the surface 190 of the base element. The first magneto elastic active region 115 is magnetized along a first circumferential direction. Within the context of the present disclosure the circumferential direction ideally designates a direction along the lateral surface of a cylinder. For example, when the base element is implemented as a cylindrical body, the circumferential direction corresponds to the direction along the lateral surface of the base element. When the base element is not implemented as a cylindric body, the circumferential direction corresponds to a direction along the circumference of a plane across the base element, wherein this plane is perpendicular with respect to the axial direction of the base element. With a polarization along the circumferential direction without a torque applied no net magnetization component in an axial direction or a radial direction is present.

The first magneto elastic active region 115 has a length in the axial direction of about 15 to 25 mm, e.g. 20 mm. The length may be in a greater range, e.g. 5 to 30 mm. The center position of the magneto elastic region corresponds to the position along the axial axis (x position) which divides the magneto elastic region along the axial direction into two halves.

The first magnetic field sensor 126 and the second magnetic field sensor 130 are disposed along the axial direction adjacent to the first magneto elastic active region 115 in such a manner that they overlap with the first magneto elastic active region 115, respectively. For example, the first and the second magnetic field sensor may be disposed at, an equal distance to the center of the magneto elastic active region 115. The first magnetic field sensor 125 and the second magnetic field sensor 130 may be disposed so as not to overlap with a portion adjacent to the first magneto elastic active region 115.

For example, fluxgate sensors, compass sensors comprising one or more axes, magnetometers or hall sensors may be used as magnetic field sensors. For example, the magnetic field sensor may be a vector sensor or vector magnetometer which measures the magnitude and polarity of the axial and/or radial field components. The magnetic field sensor may be implemented as a solid state sensor and may be based on the hall effect or the magneto resistance. According to further examples, it may be a magneto transistor ("magnistor"), a magneto diode or a MagFET ("magnetic field effect transistor").

Noise fields may be, for example, the Earth's magnetic field or may be caused by components of the bicycle or by components in the vicinity of the sensor device such as a magnetized pedal screw, an electric line, a DC motor etc. It is assumed that the action of a far field source such as the Earth's magnetic field may be considered to be constant along the axial direction, whereas the magnetic field caused by near field source may be regarded as linearly decreasing with increasing distance from the near field source 180. The distance to the near field source from the sensor device may be up to approximately 50 cm.

The first and the second magnetic field sensors 125, 130 may be disposed at the same azimuth angle.

The lower portion of FIG. 1 illustrates an example of the decreasing value of the magnetic field strength B in dependence from the distance of the near field source 180. According to a first degree of approximation it is assumed that the influence of far field sources such as the Earth's magnetic field may be neglected. The first and the second magnetic field sensors 125, 130 are suitable for determining the influence of the near field source 180, which overlaps with the first magneto elastic active region 115, respectively. The influence of the near field is illustrated by "1" and "2" evaluation units in the upper portion of FIG. 1. The measurement values measured by the first magnetic field sensor 125 and the second magnetic field sensor 130 representing a magnetic field in the first longitudinal section, respectively, are fed to the processing unit 170. The processing unit 170 determines a difference between the two signals and a sum of these signals. The influence of the near or noise field source 180 may be determined from the difference of the signals. The torque exerted on the sensor device 100 or the force acting on the sensor device 100 may be determined from the sum of the measurement signals. The evaluation of the influence of the near field source 180 and the determination of the torque may be taken from the following table 1.

TABLE 1

| Magnetic field sensor | Measured magnetic field |
| --- | --- |
| 125 | T + a |
| 130 | T + 2a |
| Sum | 2T + 3a |
| Difference (125-130) | −a | wherein "T" designates the magnetic field caused by the exerted torque and "a" designates an evaluation unit of the noise field caused by the near field source 180.

It is assumed that the magnetic field sensors are aligned in such a manner that they measure the same vector of the magnetic field.

Figure 2:
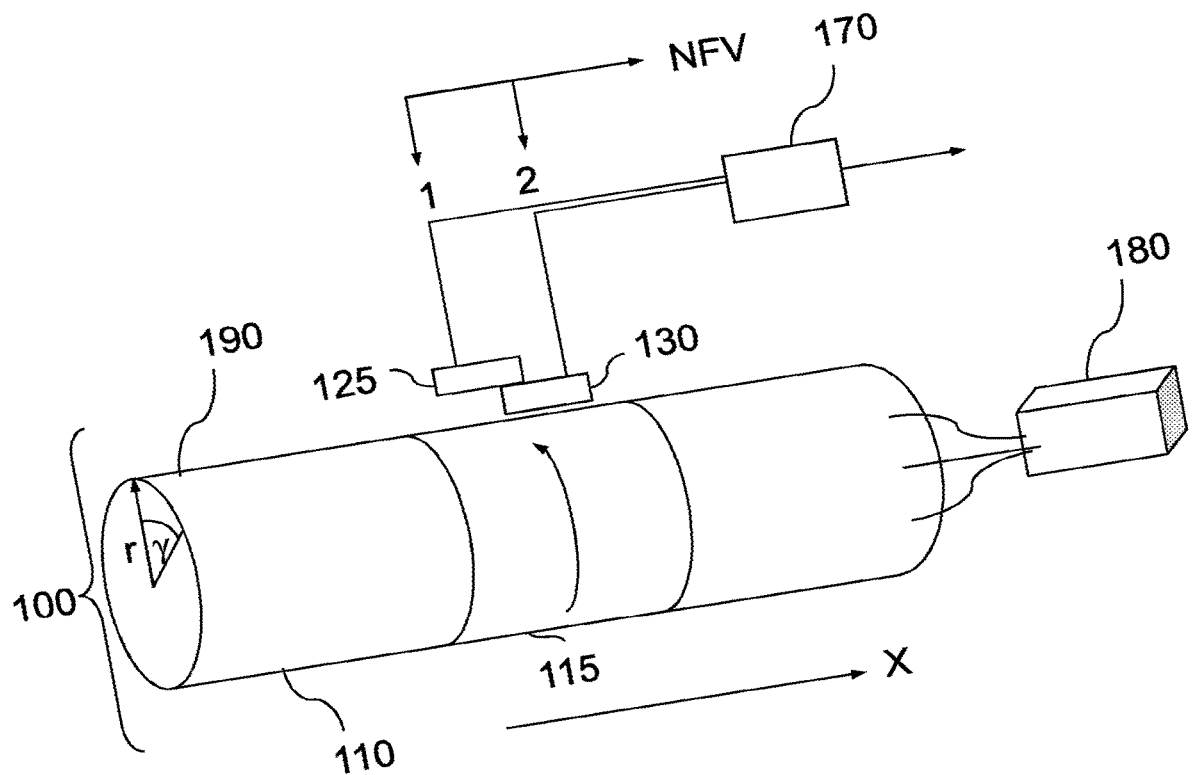
FIG. 2 shows an example of a sensor device according to a further embodiment.

Even though not shown explicitly, the sensor device may comprise further magnetic field sensors which may overlap with the first longitudinal section, for example, FIG. 2 illustrates a further embodiment of the sensor device. Differing from the embodiment illustrated in FIG. 1 the two magnetic field sensors 125 and 130 are illustrated to overlap. For example, this overlapping arrangement of magnetic field sensors may be employed when using fluxgate sensors. For example, a length of the magneto elastic active region measured along the longitudinal axis may be approximately 15 to 25 mm. The flux ate sensors may have a width measured along the longitudinal axis of approximately 4 to 20 mm. The fluxgate sensors may be disposed so that an overlapping region amounts to 1 to 8 mm in the longitudinal direction. For example, the overlapping magnetic field sensors may be arranged at different distances from the center of the bottom face of the base element 110 in a radial direction.

Figure 3:
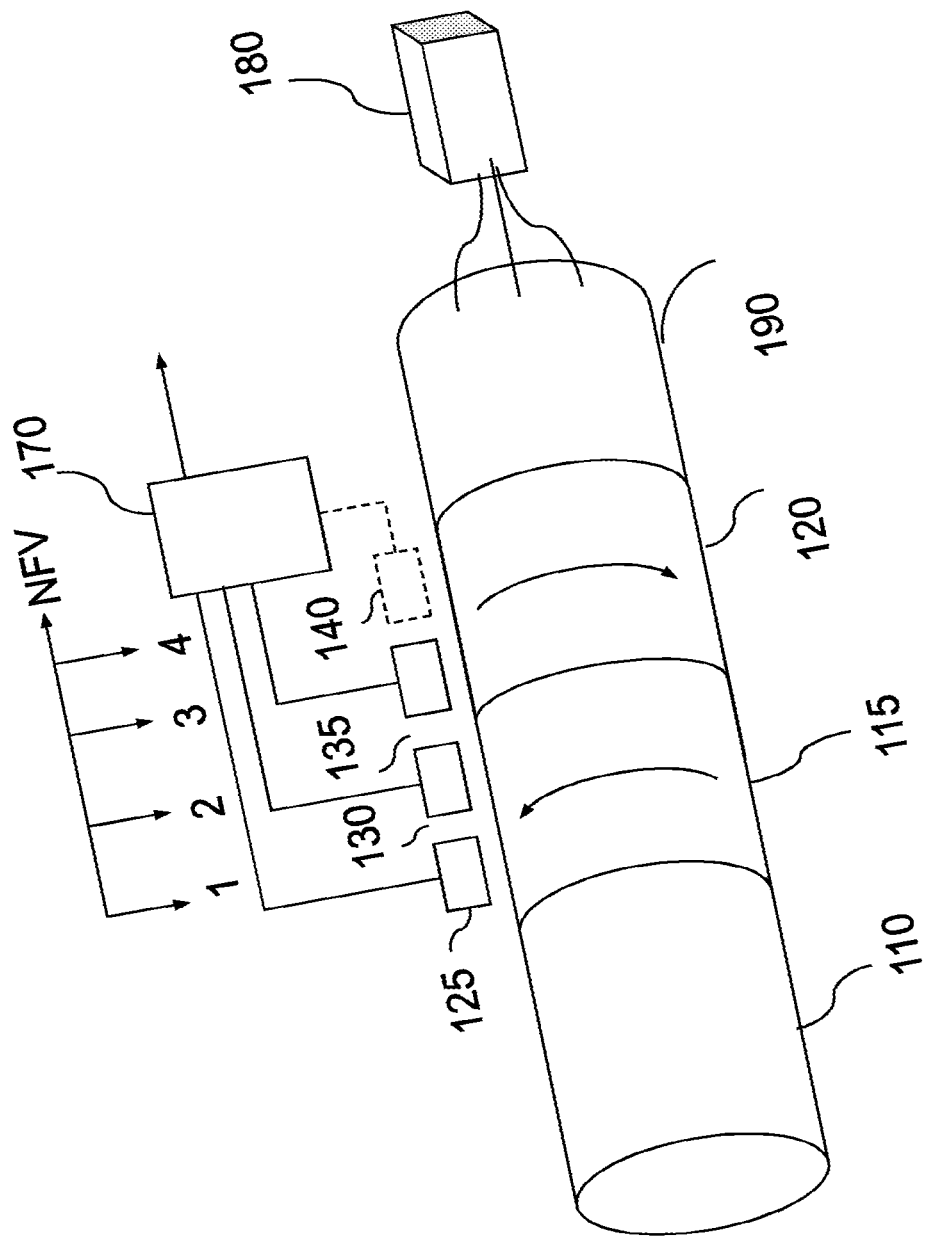
FIG. 3 shows an example of a sensor device according to a further embodiment.

FIG. 3 shows a further embodiment of the sensor device. Differing from the sensor device shown in FIG. 1 the sensor device shown in FIG. 3 comprises a second magneto elastic active region 120 which represents a second longitudinal section of the surface of the element, the second longitudinal section being different from the first longitudinal section. The second longitudinal section extends in the axial direction and may be directly adjacent to the first magneto elastic active region 115 or may be disposed at a distance to the first magneto elastic active region 115. The second magneto elastic active region 120 is magnetized in a second circumferential direction which is different from the first circumferential direction. The sensor further comprises a third magnetic field sensor 135. The third magnetic field sensor 135 is disposed at a similar distance to the center of the second magneto elastic active region 120 as the first or the second magnetic field sensor 115, 130. The second magneto elastic active region 120 preferably has the same width as the first magneto elastic active region 115. According to further embodiments, the widths of the magneto elastic region 115, 120 may be different from each other, the width being measured along the axial direction. The sensor device further may comprise a fourth magnetic field sensor 140. The third and the fourth magnetic field sensor 135, 140 are disposed in a symmetrical manner with respect to the center of the second magneto elastic active region 120, respectively, measured along the axial direction. Signals provided by the third and, optionally, the fourth magnetic field sensors 135, 140 are supplied to the processing unit 170. Using the arrangement shown in FIG. 3, the precision of the measurement may be increased. In particular, the influence caused by spatially constant magnetic fields may be eliminated. For example, the influence of the Earth's magnetic field may be cancelled.

The process unit 170 determines a sum signal and a difference signal from the signals delivered by the first, the second, the third and, optionally, the fourth magnetic field sensors in an analogous manner as has been described with reference to FIG. 1.

TABLE 2

| Magnetic field sensor | Measured magnetic field |
| --- | --- |
| 125 | T + a + b |
| 130 | T + 2a + b |
| 135 | T + 3a − b |
| 140 | T + 4a − b |
| 125 − 130 + (135-140) | −2a |
| 125 + 130 + 135 + 140 | 4T + 10a |

Differences between the measured magnetic fields in accordance with table 1 and table 2 are caused by the fact that table 2 takes into consideration the influence of the spatially constant noise field differing from table 1. In particular, "b" denotes the influence of the constant external magnetic fields.

Alternatively or in addition, the values may be determined accordance with table 3:

TABLE 3

| Magnetic field sensor | Measured magnetic field |
| --- | --- |
| k*(125-140) − l*(130-135), wherein $0.3 \leq k \leq 3.0$ and $0.3 \leq l \leq 3.0$ | k*(−3a + 2b) − l*(−a + 2b), wherein $0.3 \leq k \leq 3.0$ and $0.3 \leq l \leq 3.0$ |

The calculation in accordance with table 3 may result in more precise results when the absolute value of the measurement error included in the amplitudes measured by the sensor devices 125, 130, 135 and 140 is non-linear. In this way, the influence of external magnetic fields may be assessed in a more reliable manner.

A high precision of the measurement may be achieved using the arrangement shown in FIG. 3. In particular, the influence of spatially constant or static magnetic fields may be eliminated. A small or slim size of the sensor element may be achieved, in particular, when the sensor element includes only two magneto elastic active regions.

According to an embodiment, the sensor element may comprise further magneto elastic active regions, which are aligned with corresponding magnetic field sensors, respectively. According to an embodiment, the oppositely magnetized magneto elastic active regions 115, 120 may be magnetized by impressing current pulses. To this end, an electrode is attached at those portions of the circumference of the base element, at which the magneto elastic active regions 115, 120 are to be formed. Then, a current pulse having a current of 4-5 kA is impressed. As a result, two magneto elastic active regions 115, 120 having opposite polarization directions may be formed simultaneously due to these current pulses.

Figure 4:
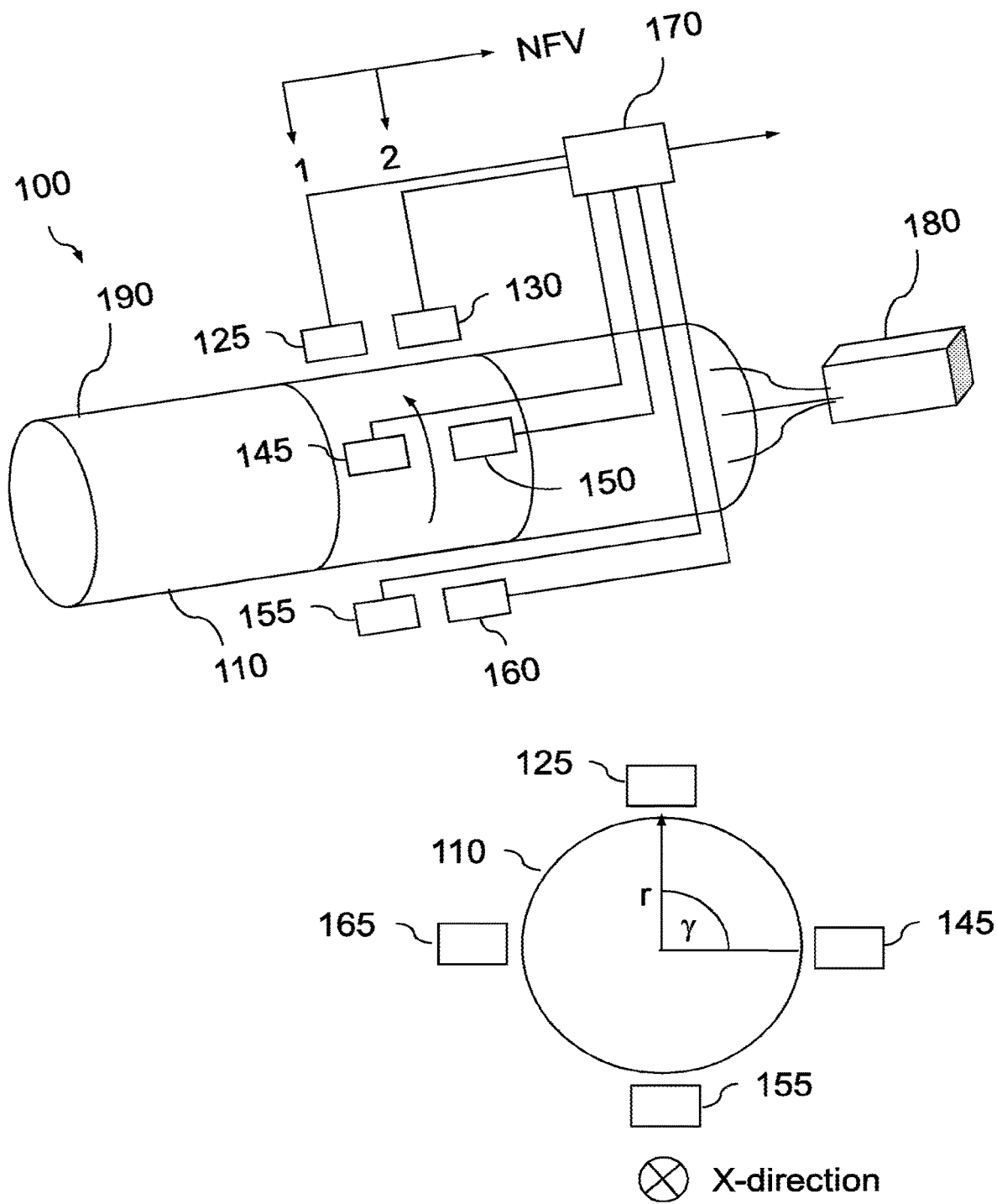
FIG. 4 shows an example of a sensor device according to a further embodiment.
Figure 5A:
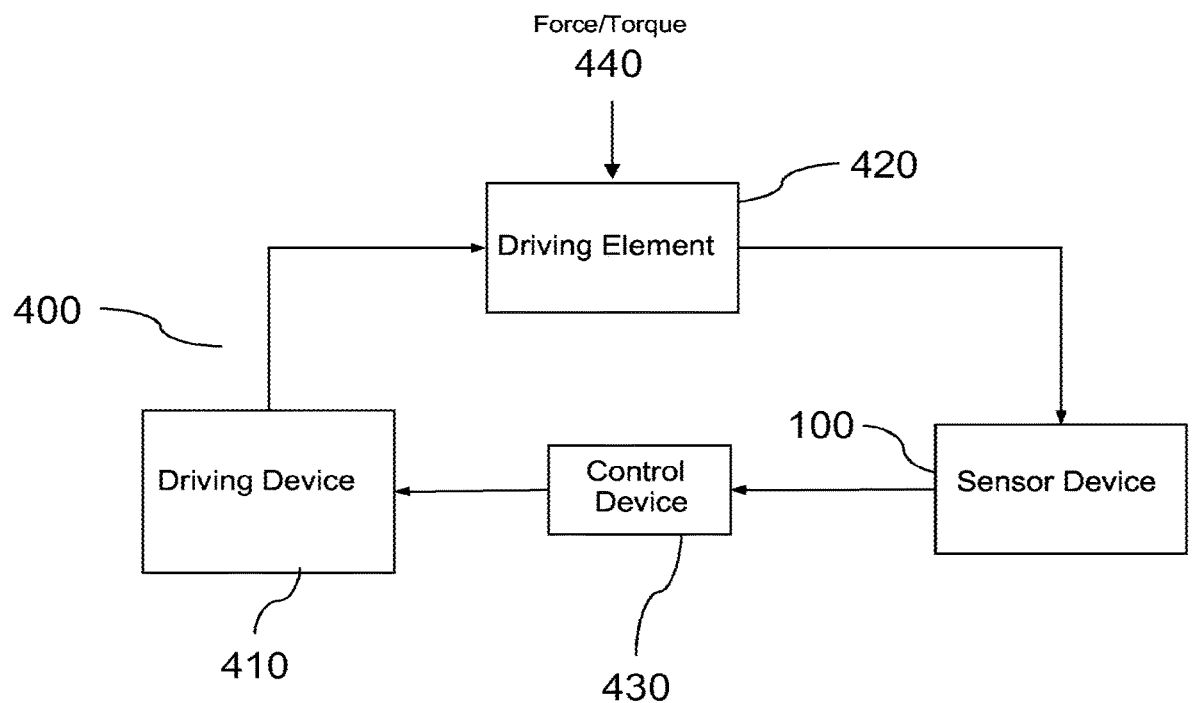
FIG. 5A shows elements of the driving system according to an exemplary embodiment of the invention.

FIG. 4 shows a sensor device according to a further embodiment. Differing from the embodiments shown in FIGS. 1 to 3, a plurality of magnetic field sensors are disposed along the circumference or surface of the sensor device at different azimuth angles γ. For example, the different pairs of sensor may be disposed at angles to 0°, 90°, 180°, and 207°. The upper part of FIG. 4 shows a perspective view of the sensor device 100. The lower part of FIG. 4 shows a cross-sectional view indicating the positions of the sensors 125, 145, 155, 165, which are arranged at different angles γ. The distance of the single sensors to the base element 110 may be equal to each other. The arrangement shown in FIG. 4 may be applied to further embodiments comprising several magneto elastic active regions having oppositely magnetization directions, FIG. 5A shows a block diagram of a driving system 400. The driving system shown in FIG. 5A comprises a driving device 410, for example, an electric motor, an hydraulic or an arbitrary different driving device. An external force or an external torque 440 acts on the driving element 420. The driving element 420 is driven by the driving device 410. The driving element 420 may be, for example, a bottom bracket or a shaft. The sensor device 100 measures the acting torque or the acting force in the manner described above using the magneto elastic effect. In particular, the sensor device is implemented in the manner as has been described in FIGS. 1 to 4. Though being illustrated as a separate component, it is clearly to be understood that elements of the sensor device 100 may be a component of the driving element 420. In particular, the base element 110 may be a component of the driving element 420. The measurement result determined by the sensor device 100 is fed to the control device 430 which controls the driving power of the driving device 410. For example, in an e-bike the power of the driving device 410 may be increased, when a higher torque is exerted so that the rider receives a very large support level from the driving device 410.

Figure 5B:
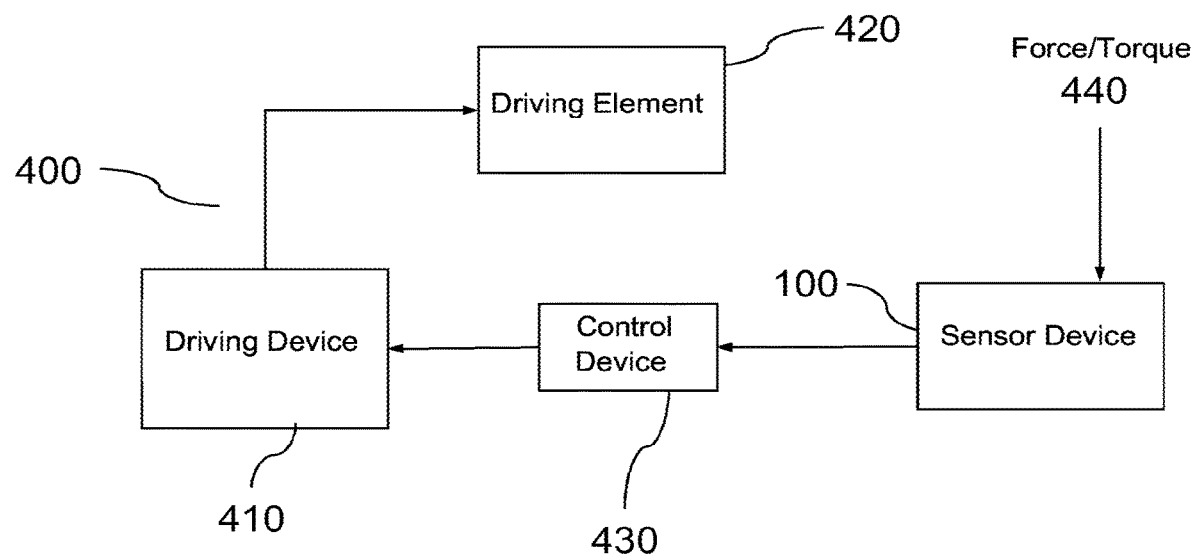
FIG. 5B shows elements of a further driving system according to an embodiment.

According to the embodiment shown in FIG. 5B the externally acting force or torque 440 may also act on the sensor device 100 which is separate from the driving element 420. For example, this may be the case, when a special handle is actuated in order to increase or decrease the power of the driving device 410. In this case, the externally acting force or torque 440 directly acts on the sensor device 100 which is decoupled from the driving element 420. The acting torque or force 440 is determined by the sensor device 100, and a corresponding signal is fed to the control device 430. Thereafter, the control device 430 increases or decreases the power of the driving device 410. The driving device 410 increases or decreases the driving power of the driving element 420.

Figure 6:
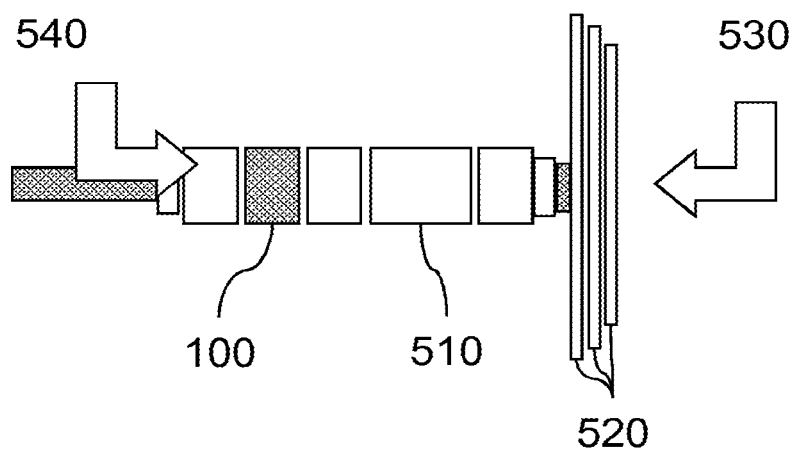
FIG. 6 illustrates a bottom bracket of a bicycle comprising a sensor device according to an embodiment.

FIG. 6 shows by way of example the bottom bracket 510 or a corresponding shaft of an e-bike. The sensor device 100 is a component of the bottom bracket. A torque 530 supplied by the right foot and a torque 540 supplied by the left foot act onto the bottom bracket 510. The total acting torque is determined in the manner described above and the power of the electric motor is correspondingly set.

Figure 7:
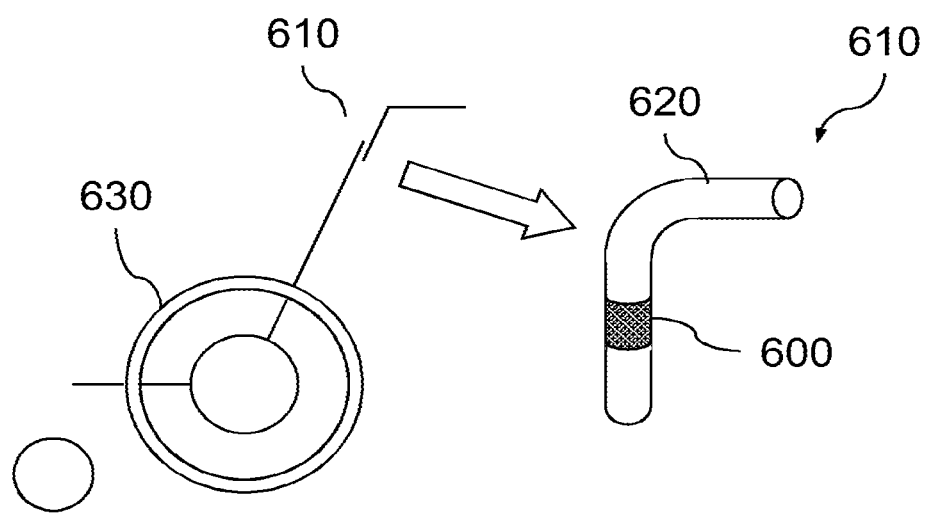
FIG. 7 shows a wheel chair comprising a sensor device according to an embodiment.

FIG. 7 shows an embodiment in which the sensor device 600 is separate from the driving element 420. FIG. 7 shows a wheel chair 630 comprising a handle 610. By actuating the handle 610 the driving power may be varied. The handle 610 comprises a first transfer device 620. By actuating the handle, e.g. by rotating or pushing, the force or a torque is imparted. The torque or force is determined by the sensor device 600. The sensor device 600 sets a driving power of the driving device 410 corresponding to the force or torque exerted. As a consequence, by actuating the handle 610 the driving power of the wheel chair 630 is determined.

The sensor device described herein above may be used for monitoring the torque, e.g., in a steering column or in a driving shaft of a drive or gear drive. A further field of application comprises the measurement of the torque in a wheel hub of agricultural engines as an overload protection, for example.

The driving systems described herein may as well be employed in these fields. Further fields of application comprise the field of machine tools, wind power stations and general generators in power stations.

Figure 8:
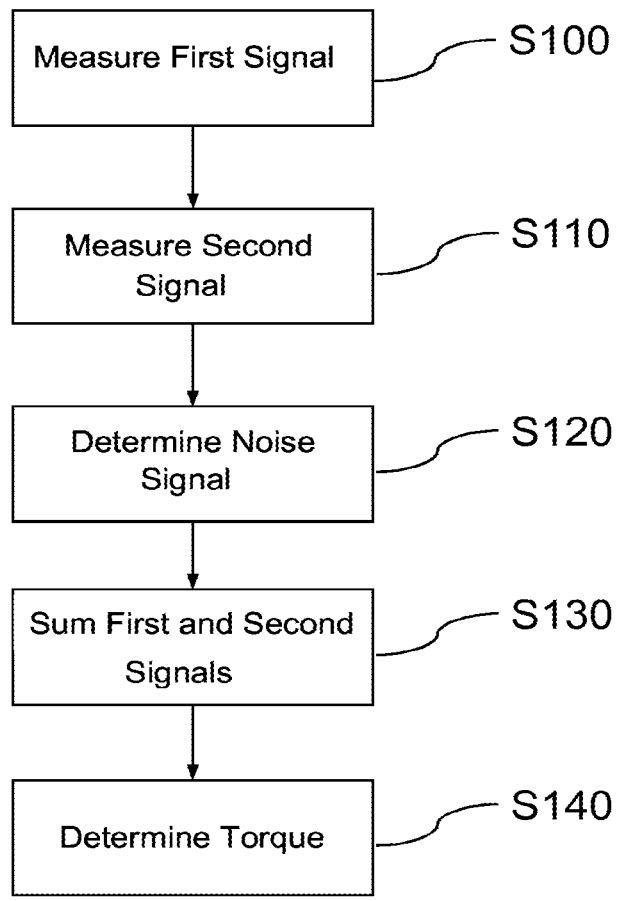
FIG. 8 is a flowchart illustrating a method according to an exemplary embodiment of the invention.

FIG. 8 summarizes a method according to an embodiment. A method for measuring a torque using the sensor device described herein comprises measuring a first signal of a first magnetic field sensor (S100), measuring a second signal of the second magnetic field sensor (S110), determining a signal difference between the first signs and the second signal to determine a noise signal (S120), determining a signal sum of the first and the second signal to determine a magnetic field caused by the torque (S130), and determining the torque using the signal difference and the signal sum (S140). Determining the signal sum and the signal difference may be performed in arbitrary order or at the same time.

Figure 9:
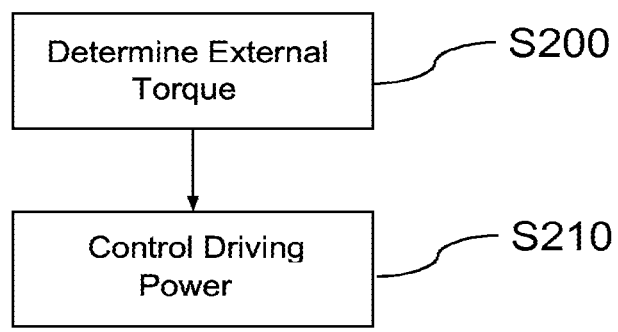
FIG. 9 shows a method according to a further embodiment.

FIG. 9 shows elements of a method according to a further embodiment. A method for controlling a driving system comprises performing the method shown in FIG. 1 to determine an externally acting torque (S200) and controlling a driving power using the externally acting torque (S210).

While embodiments of the invention have been described above, it is obvious that further embodiments may be implemented. For example, further embodiments may comprise any sub combination of features recited in the claims or any sub combination of elements described in the examples given above. Accordingly, this spirit and scope of the appended claims should not be limited to the description of the embodiments contained herein.

The invention claim is:

1. A sensor device, comprising:
   a base element extending in an axial direction;
   a magneto elastic active region representing a first longitudinal section of an outer surface of said base element, the first longitudinal section extending in the axial direction and being magnetized in a first circumferential direction;
   a first magnetic field sensor pair overlapping with the first longitudinal section, wherein the respective magnetic field sensors of the first magnetic field sensor pair are disposed above the outer surface and at a distance with respect to each other along the axial direction and at the same azimuth with respect to each other;
   a second magnetic field sensor pair overlapping with the first longitudinal section, wherein the respective magnetic field sensors of the second magnetic field sensor pair are disposed above the outer surface and at the distance with respect to each other along the axial direction and at the same azimuth with respect to each other;
   a third magnetic field sensor pair overlapping with the first longitudinal section, wherein the respective magnetic field sensors of the third magnetic field sensor pair are disposed above the outer surface and at the distance with respect to each other along the axial direction and at the same azimuth with respect to each other; and
   a fourth magnetic field sensor pair overlapping with the first longitudinal section, wherein the respective magnetic field sensors of the fourth magnetic field sensor pair are disposed above the outer surface and at the distance with respect to each other along the axial direction and at the same azimuth with respect to each other,
   wherein the first sensors of the first, second, third, and fourth magnetic field sensor pairs are disposed at the same axial position relative to each other and are disposed along the circumference of the base element at that axial position relative to each another by an azimuth angle of 90°.

2. The sensor device according to claim 1, wherein said magneto elastic active region is a first magneto elastic active region and the sensor device further comprises:
   a second magneto elastic active region representing a second longitudinal section that is different from said first longitudinal section, of the surface of said base element, the second longitudinal section extending in the axial direction and being magnetized in a second circumferential direction.

3. The sensor device according to claim 2, wherein the first magneto elastic active region has an axial length of about 5 to 30 mm, and wherein the second magneto elastic active region has an axial length of about 5 to 30 mm.

4. The sensor device according to claim 1, further comprising a processing unit configured to receive a signal from each one of the magnetic field sensors of the first, the second, the third, and the fourth magnetic field sensor pairs and a signal from each of the other ones of the magnetic field sensors of the magnetic field sensor pairs, and configured to generate
   a sum signal representing a sum of the signals from the each one of the magnetic field sensors of the first, the second, the third, and the fourth magnetic field sensor pairs and the signals from each one of the other ones of the magnetic field sensor pairs, and
   a difference signal representing a difference between the signals from the each one of the magnetic field sensors of the first, the second, the third, and the fourth magnetic field sensor pairs and the signals from each one of the other ones of the magnetic field sensor pairs.

5. A driving system for an e-bike bottom bracket, comprising:
   a driving device for driving a driving element, wherein the driving device is an electric motor and the driving element is connected to the bottom bracket;
   a sensor element according to claim 1 disposed to determine if an externally acting force or torque is acting on the driving element and an amount of the force or torque; and
   a control device for receiving a signal from the sensor element and for controlling an amount of a torque or a force to be generated by the driving device and acting on the driving element, such that when the sensed externally active force or torque increases the amount of torque or force generated by the driving device to the driving element increases.

6. A method for measuring a torque, the method comprising:
   providing a sensor device according to claim 1;
   receiving a first signal from one of the first magnetic field sensors of each magnetic field sensor pair and a second signal from the respective other magnetic field sensors of each magnetic field sensor pair;
   determining a difference signal of the respective first and second signals from each of the magnetic field sensors of each magnetic field sensor pairs to determine a noise signal for each pair;
   determining a sum signal of the respective first and second signals from each of the magnetic field sensors of each magnetic field sensor pairs to determine a magnetic field value caused by the torque; and determining the torque using the difference signals and the sum signals.

7. The method according to claim 6, further comprising: controlling a driving power of a driving system using the torque so determined.

8. The sensor device according to claim 1, wherein the first magneto elastic active region has an axial length of about 5 to 30 mm.

9. A sensor device, comprising:
a hollow base element extending in an axial direction;
a magneto elastic active region disposed on an inner surface of the hollow base element representing a first longitudinal section of the surface of the base element, the first longitudinal section extending in the axial direction and being magnetized in a first circumferential direction;
a first magnetic field sensor pair overlapping with the first longitudinal section, wherein the respective magnetic field sensors of the first magnetic field sensor pair are disposed above the inner surface and at a distance with respect to each other along the axial direction and at the same azimuth with respect to each other;
a second magnetic field sensor pair overlapping with the first longitudinal section, wherein the respective magnetic field sensors of the second magnetic field sensor pair are disposed above the inner surface and at the distance with respect to each other along the axial direction and at the same azimuth with respect to each other;
a third magnetic field sensor pair overlapping with the first longitudinal section, wherein the respective magnetic field sensors of the third magnetic field sensor pair are disposed above the inner surface and at the distance with respect to each other along the axial direction and at the same azimuth with respect to each other;
a fourth magnetic field sensor pair overlapping with the first longitudinal section, wherein the respective magnetic field sensors of the fourth magnetic field sensor pair are disposed above the inner surface and at the distance with respect to each other along the axial direction and at the same azimuth with respect to each other; and a processing unit configured to receive from one of the magnetic field sensors of each of the plurality of magnetic field sensor pairs a respective first signal and from the other magnetic field sensors of each of the plurality of magnetic field sensor pairs a respective second signal, and configured to generate a sum signal representing a sum of the first and second signals and a difference signal representing a difference between the first and second signals, wherein the first sensors of the first, second, third, and fourth magnetic field sensor pairs are disposed at the same axial position relative to each other and are disposed along the circumference of the base element at that axial position relative to each another by an azimuth angle determined of 90°.

10. The sensor device according to claim 9, wherein the processing unit is further configured to generate a difference signal according to, k*(Σ of the signals from one of the magnetic field sensors of each of the first sensors of the first, second, third, and fourth magnetic field sensor pairs) minus l*(Σ of the signals from the second sensors of the first, second, third, and fourth of the magnetic field sensor pairs), wherein $0.3 \le k \le 3.0$ and $0.3 \le l \le 3.0$.

11. The sensor device according to claim 9, wherein the processing unit is further configured to control an amount of a torque or a force to be generated by a driving device that acts on a driving element, such that when a sensed externally active force or torque increases the amount of torque or force generated by the driving device to the driving element increases.

* * * * *

UNITED STATES PATENT AND TRADEMARK OFFICE
CERTIFICATE OF CORRECTION

PATENT NO. : 10,557,765 B2
APPLICATION NO. : 16/103481
DATED : February 11, 2020
INVENTOR(S) : Josua Lanter Page 1 of 1

It is certified that error appears in the above-identified patent and that said Letters Patent is hereby corrected as shown below:

On the Title Page

Item (73) Assignee: POLYRESEARCH AG, Chur (CH) should read "ABAS INC., Chicago, IL (US)".

Signed and Sealed this
Twenty-fifth Day of August, 2020

Andrei Iancu
*Director of the United States Patent and Trademark Office*